United States Patent [19]
Stanis

[11] Patent Number: 5,095,746
[45] Date of Patent: Mar. 17, 1992

[54] AIRCRAFT BANKING ANGLE INDICATOR

[76] Inventor: John W. Stanis, 3020 NE. 13th Ave., Pompano Beach, Fla. 33069

[21] Appl. No.: 647,420

[22] Filed: Jan. 29, 1991

Related U.S. Application Data

[63] Continuation-in-part of Ser. No. 141,573, Jan. 7, 1988, abandoned.

[51] Int. Cl.$^5$ .............................................. G01C 19/02
[52] U.S. Cl. ................................... 73/178 R; 244/79; 244/179; 340/975
[58] Field of Search ............. 73/178 R, 178 T, 178 H, 73/180; 340/975, 974, 967; 244/179, 79

[56] References Cited

U.S. PATENT DOCUMENTS

4,094,200  6/1978  Chombard .......................... 340/975

FOREIGN PATENT DOCUMENTS

0309896  12/1989  Japan .................................. 340/975

*Primary Examiner*—Donald O. Woodiel
*Attorney, Agent, or Firm*—Oltman and Flynn

[57] ABSTRACT

An aircraft banking angle indicator which includes a banking angle sensing arrangement for generating an actual banking angle signal, a maximum banking angle input device for manually entering a selected maximum banking angle, a signal processing arrangement having respective inputs connected to the banking angle sensing arrangement and to the maximum banking angle input devices for generating an excessive banking output signal indicative of a banking angle exceeding the maximum banking angle, and an indicating arrangement having a signal input connected to the banking angle output signal for indicating the excessive banking angle.

13 Claims, 4 Drawing Sheets

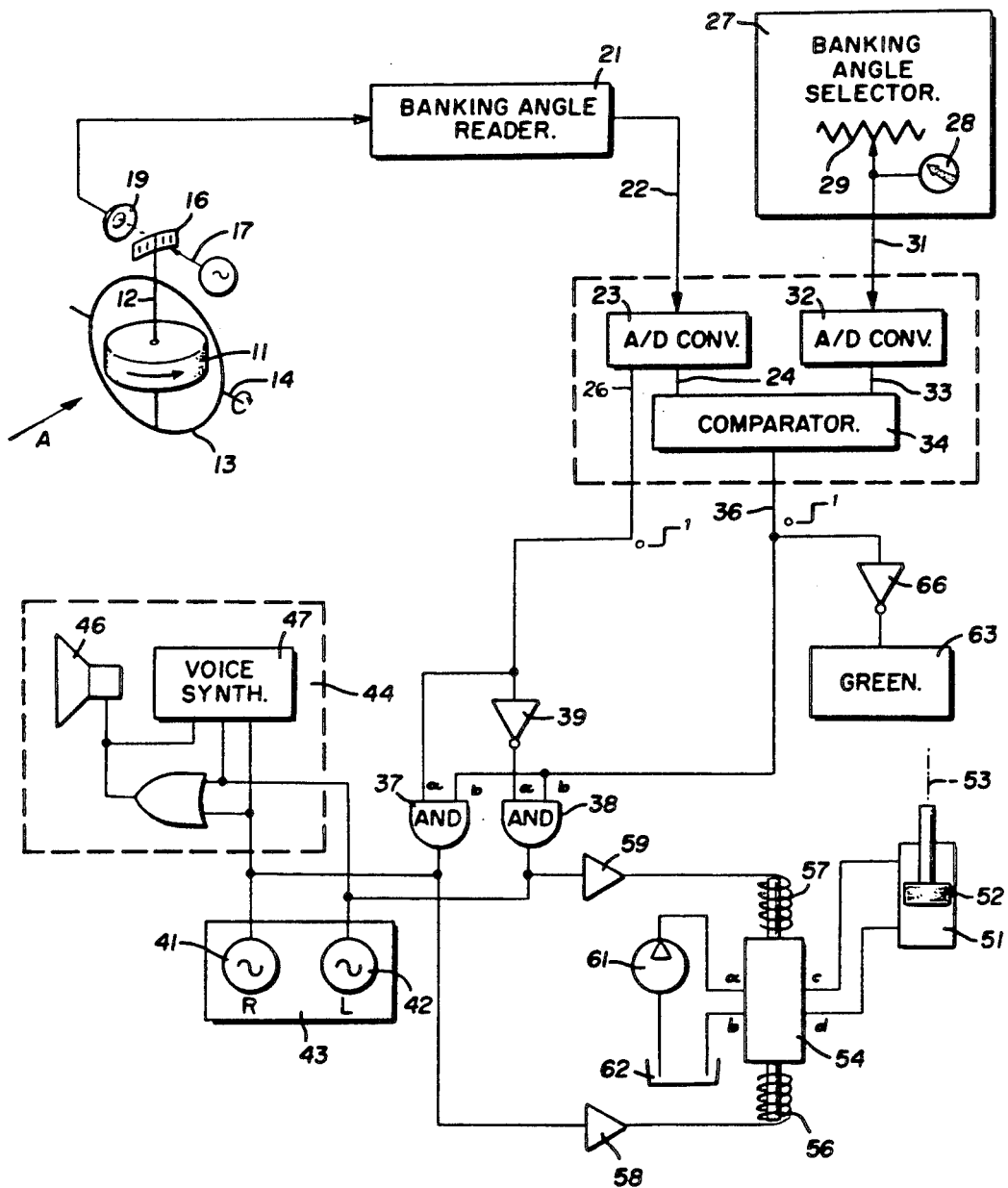
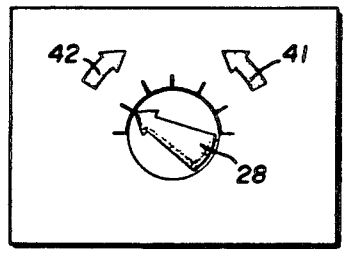
FIG. 1
FIG. 6

AIRCRAFT BANKING ANGLE INDICATOR

This application is a continuation-in-part of application Ser. No. 07/141,573 filed Jan. 7, 1988, now abandoned.

The invention relates to aircraft control devices, and more particularly to an aircraft banking angle indicator, and means coupled to the banking angle indicator for visually indicating excessive manually entered banking angles and automatic means for automatically restoring the aircraft to a safe banking angle.

BACKGROUND AND PRIOR ART

In piloting an aircraft it can happen to a pilot finding him or herself in difficult weather conditions that visual contact is lost, and as a result the pilot may inadvertently bring the aircraft into an unsafe attitude. Such unsafe attitudes, known to pilots as spins or stalls, are often caused by the aircraft getting into an excessive banking angle. Under such conditions a less experienced pilot will subconsciously tend to pull back on the control wheel or stick, which will aggravate the unsafe attitude and lead to pilot vertigo, in which case the pilot loses spatial orientation and possibly crashes the aircraft.

This condition is especially prevalent in smaller aircraft not normally equipped with instruments that automatically inform the pilot of any dangerous attitude of the aircraft.

It can be shown and is well known that in case a pilot enters a dangerous attitude such as a spin, the safest corrective action includes a leveling of the wings with the horizon, but if he cannot see the horizon he may be unable to perform the leveling maneuver.

It is known in the prior art to provide an aircraft gyro-horizon indicator with signal lamps as positional attitude indicator means, as disclosed in U.S. Pat. No. 3,852,710. The known attitude indicators, however, have the drawback that they require constant attention of the pilot who has many other indicators that require his attention. It is therefore an object of the instant invention to provide an unsafe attitude indicator that constantly monitors the banking angle and only makes an indication in case the aircraft banking angle exceeds a given value as selected by the pilot. It is a further object to provide such an indicator that cooperates with the aircraft control elements to automatically restore the aircraft to a safe banking angle in case it should inadvertently be exceeded.

SUMMARY OF THE INVENTION

In accordance with the stated object there is provided an aircraft banking angle indicator which includes a banking angle sensing arrangement for generating an actual banking angle signal, a maximum banking angle input device for manually entering a selected maximum banking angle, a signal processing arrangement having respective inputs connected to the banking angle sensing arrangement and to the maximum banking angle input devices for generating an excessive banking output signal indicative of a banking angle exceeding the entered maximum banking angle, and an indicating arrangement having a signal input connected to the banking angle output signal for indicating the excessive banking angle.

In accordance with a further feature there is provided a banking angle indicator which includes an aircraft attitude control arrangement in the aircraft, having an input connected to the banking angle output signal for automatically restoring the aircraft banking angle to a value no greater than the entered maximum banking angle.

In accordance with still another feature, there is provided a banking angle indicator including a gyro with an axis disposed substantially in a plane perpendicular to the axis of the aircraft in the banking angle sensing arrangement, and an electronic reading arrangement coupled to the gyro for reading the banking angle from said gyro.

According to a still further feature, there is provided a banking angle indicator wherein the gyro is a part of an aircraft turn coordinator, or a part of an aircraft flight director system, or an artificial horizon indicator.

According to an additional feature, the banking angle indicator according to the invention has an analog signal which is analogous to the sensed banking angle including an analog-to-digital converter in the signal processing arrangement for converting the actual banking angle signal to a digital signal indicative of the actual banking angle, and it may further include an analog-to-digital converter in the banking angle input arrangement for converting the selected maximum banking angle to a digital signal indicative of the selected banking angle.

The banking angle indicator according to the invention may further include a microprocessor in the signal processing arrangement, inputs to the microprocessor for respectively reading the digital signal indicative of the actual banking angle and the digital signal indicative of the selected banking angle; a comparator arrangement in the microprocessor for comparing the digital signal indicative of the actual banking angle and the digital signal indicative of the selected banking angle and generating a comparator output signal indicative of an actual excessive banking angle, i.e. banking angle greater than the selected banking angle, wherein the output signal indicative of the excessive banking angle is connected to the visual signal input for visually indicating the excessive banking angle.

In the banking angle indicator according to the invention, the comparator output signal may further have a directional signal indicative of the direction of the excessive banking angle, wherein the visual indicating arrangement includes an input connected to the directional signal, and visual indicators for indicating direction of the corrective action required to restore the aircraft to a safe banking angle.

The banking angle indicator may further have servo actuators with inputs coupled to the excessive banking angle output signal, and outputs connected to the attitude control means, and furthermore aileron controls coupled to the excessive banking angle output signal, and additionally an audible signal generator coupled to the signal processing arrangement for audibly indicating presence of a banking angle exceeding the excessive banking angle.

Further objects and advantages of this invention will be apparent form the following detailed description of the presently preferred embodiments which are illustrated schematically in the accompanying drawings.

BRIEF DESCRIPTION OF THE DRAWINGS

FIG. 1 is a block diagram of the invention showing its major function blocks;

FIG. 6 is an elevational view of a cockpit-mounted banking signal indicator with a dial for entering the selected maximum banking angle.

Figure 2:
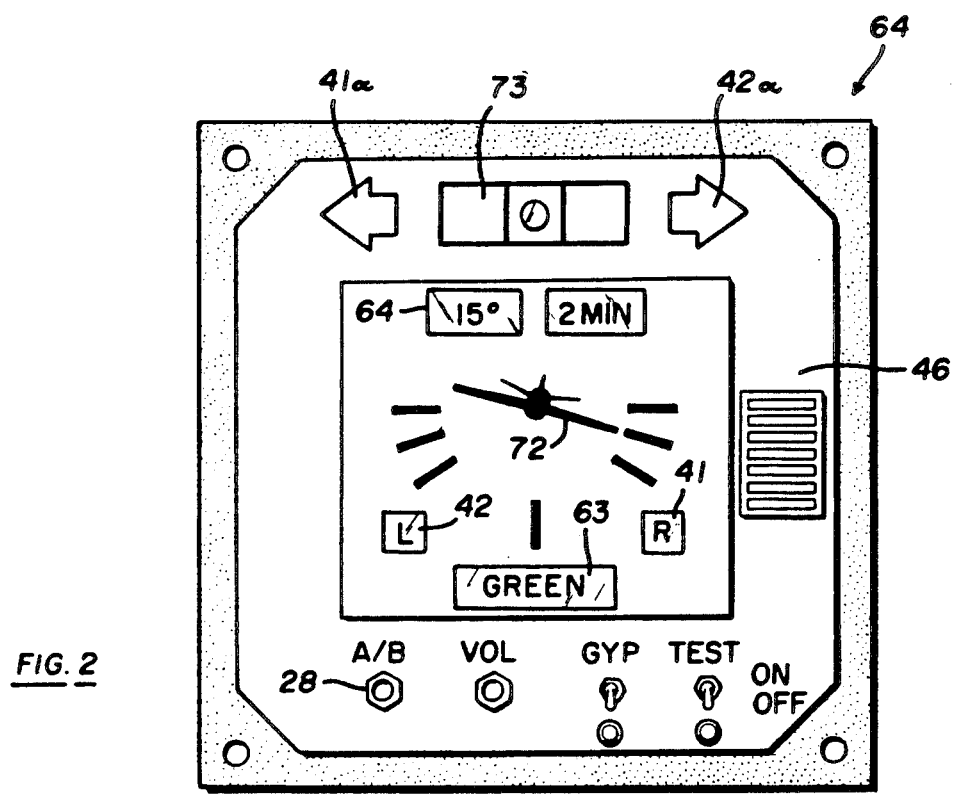
FIG. 2 is an elevational view of the invention showing a typical embodiment of the visual banking indicator according to the invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

In FIG. 1 an aircraft gyro 11, with its axis in a plane substantially perpendicular to the axis of the aircraft, is mounted with its gyro axis 12 in a gimbal 13 balanced about an axis 14 substantially parallel with the axis, shown by arrow A, of the aircraft in which it is mounted. The gyro may be dedicated to the banking angle indicator according to the invention, but it may as well be a part of some other aircraft instrument such as an artificial horizon, a flight director or a bank and turn coordinator, an automatic pilot or any other flight instrument having a suitable gyro. The gyro has, as in most flight instruments an electronic readout that transmits its functions to other parts of an integrated avionics system. The electronic readout can have many different forms and is illustrated as an example as a scale 16 attached to the gimbal 13 with optical gradings, that is interrogated by a light beam 17 from a light source 18, directed at a photo sensor 19. Any movement of the aircraft about its longitudinal axis, including banking, is indicated as information embedded in the light beam 17 as received by the photosensor 19.

Depending upon the type of gradings on the scale 16, the banking angle can be read out by a banking angle reader circuit 21 either in the form of an analog output on lead 22 or in the form of a digital output in some suitable digital format. If required, the signal on lead 22 is converted to a binary-digital format in an analog-digital converter 23 (A/D converter) which on lead 24 generates an absolute digital binary value representing the degree of angle of banking, and on output 26 a signal indicating left or right banking in the form of a high or low logic level on lead 26. In conventional binary logic, lead 26 carries the "sign" bit of the binary digital output, while the lead 24 carries the remaining bits. A banking angle selector 27 has a dial 28 for manually entering the desired maximum angle of banking on e.g. a potentiometer 29 which generates on lead 31 an analog potential representing the desired maximum angle of banking which is entered by the pilot as the maximum banking angle he wishes to stay within.

Another A/D converter 32 converts entered maximum banking angle also to binary digital information. A digital comparator 34 receives the absolute banking angle values from the two A/D converters 23,32, and generates an output which may be logic high e.g. if the value on lead 24 is greater than the value on lead 33, i.e. lead 36 goes from logic low to logic high if the actual banking angle sensed by the gyro 11 is greater than the selected maximum banking angle entered on the banking angle selector 27.

A logic circuit having two AND-gates 37/38, each with inputs a and b, evaluates the signals on the three leads 24,26 and 36 to determine if the actual banking angle is excessive, i.e. greater than the selected banking angle, and if it is to left or right. An inverter 39 presents an inverted logic value of the signal on lead 26 to input a of AND-gate 38, while input a of AND-gate 37 receives the un-inverted signal from lead 26. Assuming that a right banking angle is indicated by a logic high on lead 26, and an excessive banking angle is indicated by a logic high on lead 36, both inputs a and b of AND-gate 37 will be high, and its outputs will be high, and an indicator light 41 labeled "R" will light up, indicating to the pilot an excessive right banking angle. Conversely, indicator light labeled "L" will light up, indicating if an excessive left banking angle is indicated.

The two indicator lights 41,42 may be located in an instrument-panel-mounted display which may advantageously include the components of the banking angle selector 27, as shown in FIG. 6, wherein each of the two light indicators 41,42 is shaped as an arrow indicating to the pilot the required corrective direction he is to undertake in order to regain stable flight attitude.

An audible indicator 44 may be provided which includes a loudspeaker 46 driven either by a voice synthesizer 47 which verbally directs the pilot or simply issues an alert signal as known from conventional aircraft indicators, such as stall-alarms and the like.

An automatic banking angle restoring arrangement, acting on the aircraft ailerons and/or rudder is shown in the form of an hydraulic system including an hydraulic cylinder 51 with a piston 52 coupled through linkage 53 to the aircraft ailerons (not shown). The hydraulic cylinder 51 is connected to a hydraulic valve with a valve spool 54 operated by two opposite solenoids 56,57, respectively connected via amplifiers 58,59 to the outputs of respective AND-gates 37,38. A hydraulic pump 61 supplies hydraulic pressure to an inlet port a of the hydraulic valve 54, which has its other inlet port b connected to a hydraulic fluid tank 62, as is conventional in hydraulic control systems. In case AND-gate 37 becomes active, indicating excessive right banking angle, the valve spool 54 is activated by solenoid 56, causing pressure to be applied to the top end of the hydraulic cylinder 51, causing its piston 52 to go down, or conversely to go up if AND-gate 38 is activated.

FIG. 2 shows the banking angle indicator integrated with the light indicators 41,42, according to the invention, into a conventional electric turn coordinator. The directional arrows are shown separately as arrows 41a and 42a at the top of the instrument face panel 64, which also includes the selected angle of bank dial 28 (A/B) and other elements and displays as required for the operation of the turn coordinator, such as gyro power (GYP), test (TEST), an aircraft banking angle symbol 27 and so forth, which are incidental to the instant invention. A sound outlet for the speaker 46 may also be provided on the instrument face. A green light indicator 63 showing normal banking angles is driven by an inverter 66 from output 36 in FIG. 1.

Figure 3:
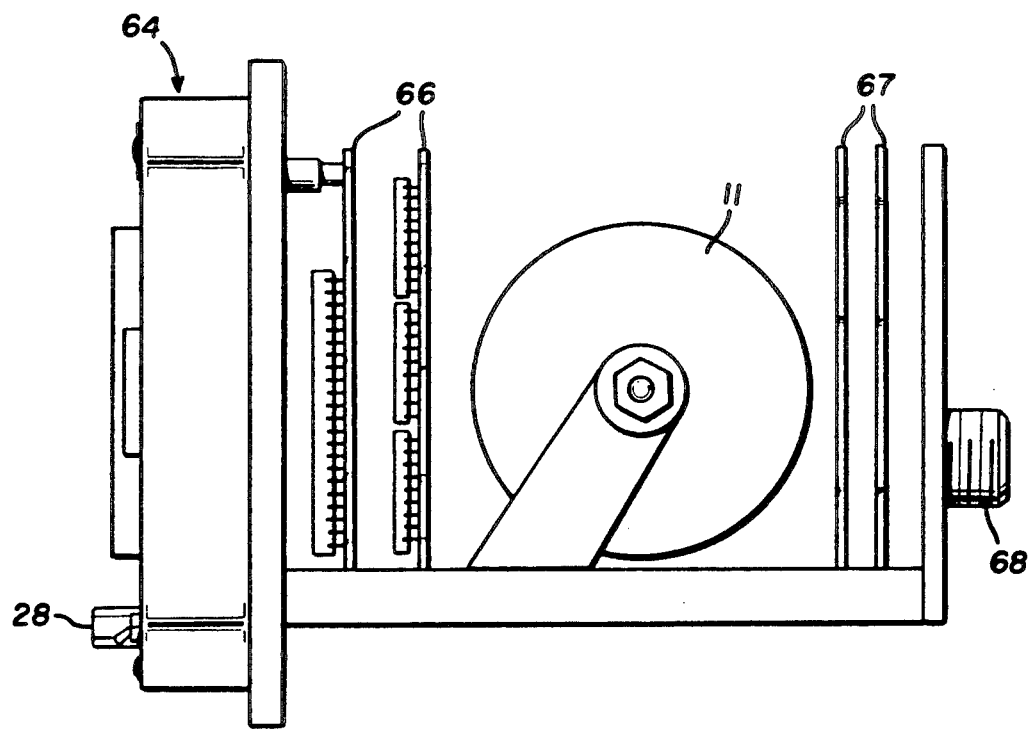
FIG. 3 is an elevational view of the invention showing a gyro, and electronic components.

FIG. 3 is an elevational view of the turn coordinator of FIG. 2, showing a gyro 11, printed circuit boards 66,67 for mounting the electronic components, and a cable connector 68 for attaching connecting cables to other aircraft instruments.

Figure 4:
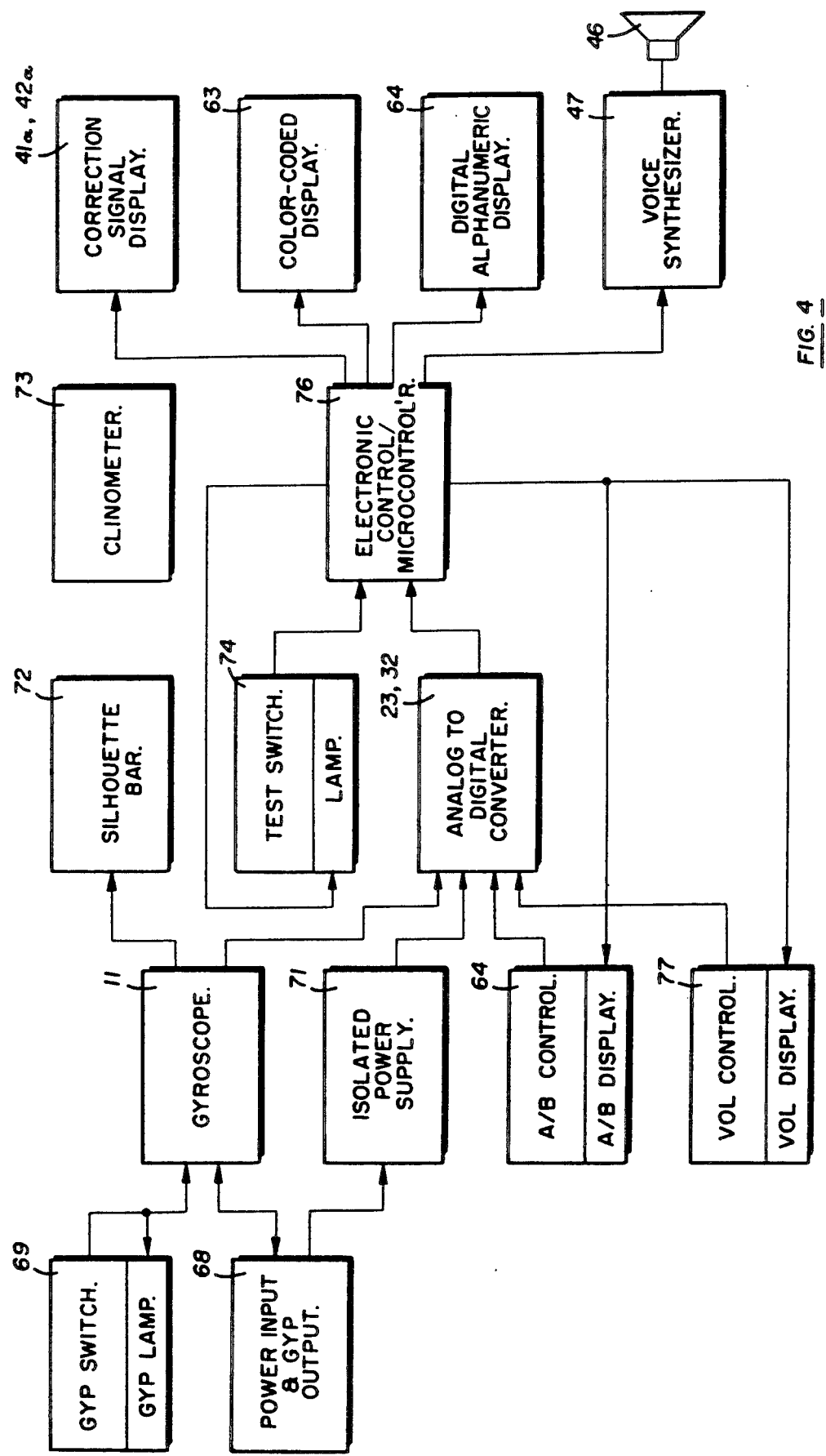
FIG. 4 is a block diagram of the invention showing an embodiment with a microcontroller.

FIG. 4 is a block diagram showing the interconnections of the major function blocks of the invention, including the gyro on/off switch 69 (GYP), the gyro 11, a power supply 71, the gyro cable connector 68, the angle of banking control panel 64, a volume control 77 for the speaker/buzzer 46, a silhouette bar 72, i.e. the aircraft symbol on FIG. 2, a clinometer 73, also seen on FIG. 2, a test switch 74 with a lamp, the analog-to-digital converters 23,32, an electronic control 76 including the electronic circuits of FIG. 1, and/or a microcontroller performing the same control functions, but using a stored program in memory, a correction display with display lights 41a,42a, a color-coded display 63, an alpha-numeric display 64 for indicating various aircraft indications, the voice synthesizer and the speaker/buzzer 46.

Figure 5:
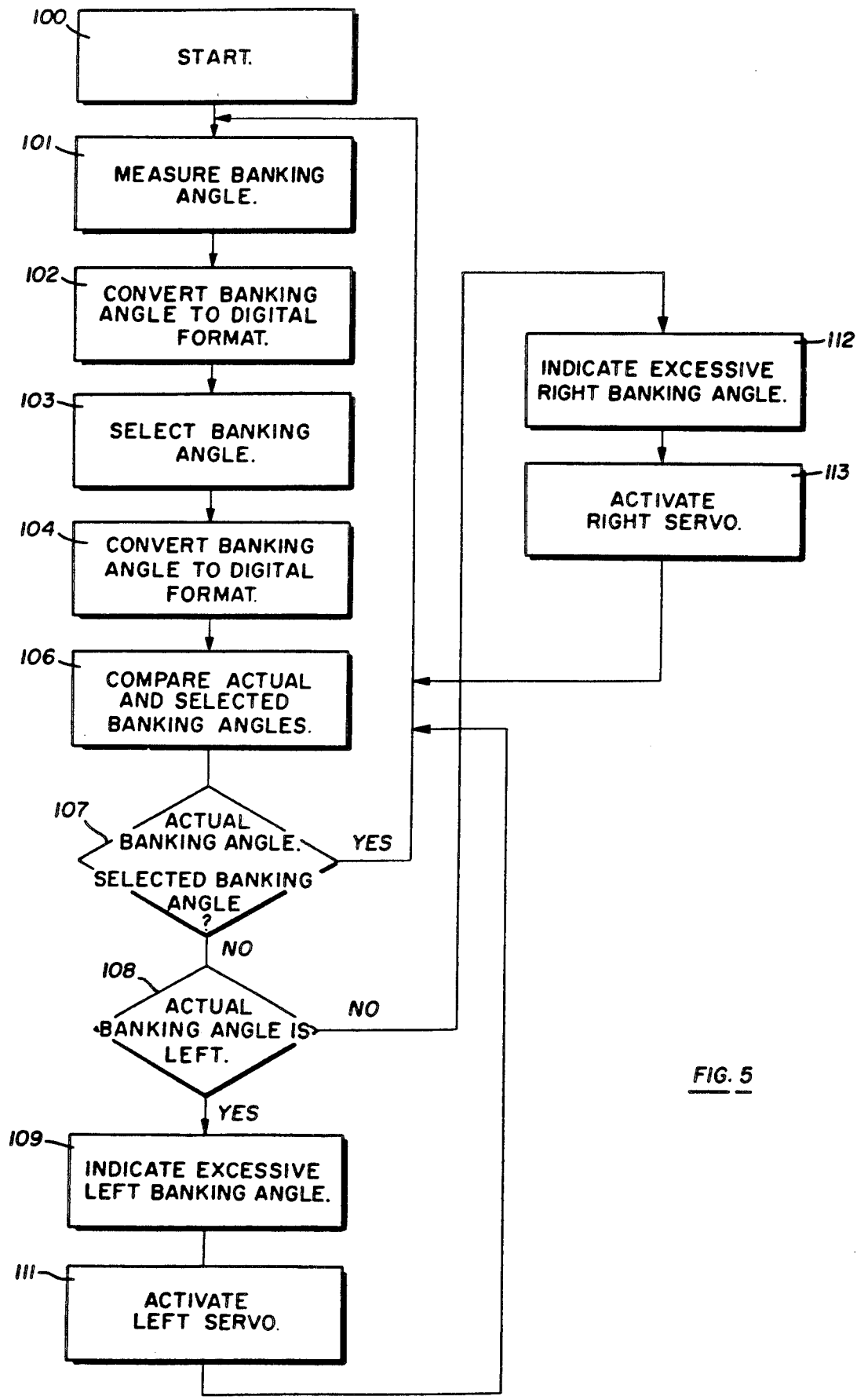
FIG. 5 is a flow chart showing steps of the operation.

The flow chart of FIG. 5 shows the major steps of the operation of the banking angle indicator of the invention. After Start 100, i.e. setting power on, initiating the instruments and so forth, the actual banking angle is measured in step 101 and converted to digital binary format in step 102. The maximum banking angle is selected in step 103 and also converted to digital binary format in step 104. The actual and selected banking angles are compared in step 106, which determines if the actual banking angle is not greater than the selected banking angle in step 107. If the actual banking angle in step 107 is no greater than the selected banking angle, the measuring process continues in step 102, but if the actual banking angle is greater than the selected angle a determination is made in step 108 to determine if the banking angle is left or right. If the actual banking angle is found to be left, an indication of excessive left banking angle is made in step 109, and the left servo is activated in step 111 to correct the banking angle to the right. Conversely, if in step 108 a right banking angle is determined, the next step 112 indicates excessive right banking angle to the servo, which makes correction to the left.

I claim:

1. A banking angle indicator for an aircraft comprising banking angle sensing means for generating an actual banking angle signal, maximum banking angle input means for manually entering a selected maximum banking angle, signal processing means having respective inputs connected to said banking angle sensing means and to said maximum banking angle input means for generating an excessive banking angle signal indicative of an actual banking angle exceeding said selected maximum banking angle, and visual indicating means having an input connected to said excessive banking angle signal for visually indicating presence of excessive banking angle.

2. A banking angle indicator according to claim 1 including aircraft attitude control means in said aircraft having an input connected to said excessive banking angle signal for automatically restoring the aircraft banking angle to a value no greater than the maximum banking angle.

3. A banking angle indicator according to claim 2, including a gyro with an axis disposed substantially in a plane perpendicular to the axis of the aircraft in said banking angle sensing means, and electronic reading means coupled to said gyro for reading said banking angle signal from said gyro.

4. A banking angle indicator according to claim 3 wherein said gyro is a part of an aircraft turn coordinator.

5. A banking angle indicator according to claim 3 wherein said gyro is a part of an aircraft flight director system.

6. A banking angle indicator according to claim 3 wherein said actual banking angle signal is an analog signal analogous to the actual banking angle including an analog-to-digital converter in said signal processing means for converting said actual banking angle signal to a digital signal indicative of said actual banking angle.

7. A banking angle indicator according to claim 6 including an analog-to-digital converter in said maximum banking angle input means for converting said selected maximum banking angle to a digital signal indicative of said selected maximum banking angle.

8. A banking angle indicator according to claim 7, including a microprocessor in said signal processing means, inputs to said microprocessor for respectively reading said digital signal indicative of said actual banking angle and said digital signal indicative of said selected banking angle; comparator means in said microprocessor for comparing said digital signal indicative of said actual banking angle and said digital signal indicative of said selected banking angle and generating a comparator output signal indicative of excessive banking angle, said excessive banking angle signal being connected to said visual indicating means for visually indicating said excessive banking angle.

9. A banking angle indicator according to claim 8 wherein said comparator output signal includes a directional signal indicative of the direction of the excessive banking angle.

10. A banking angle indicator according to claim 9, wherein said visual indicating means include an input connected to said directional signal, and visual indicators for indicating direction of corrective action required to restore the aircraft to a banking angle within said selected maximum banking angle.

11. A banking angle indicator according to claim 2 including servo actuators having inputs coupled to said excessive banking angle output signal and outputs connected to said attitude control means.

12. A banking angle indicator according to claim 11, wherein said attitude control means include aileron controls coupled to said excessive banking angle output signal.

13. A banking angle indicator according to claim 1, including an audible signal generator coupled to said signal processing means for audibly indicating presence of a banking angle exceeding said excessive banking angle.

* * * * *